United States Patent Office 3,531,849
Patented Oct. 6, 1970

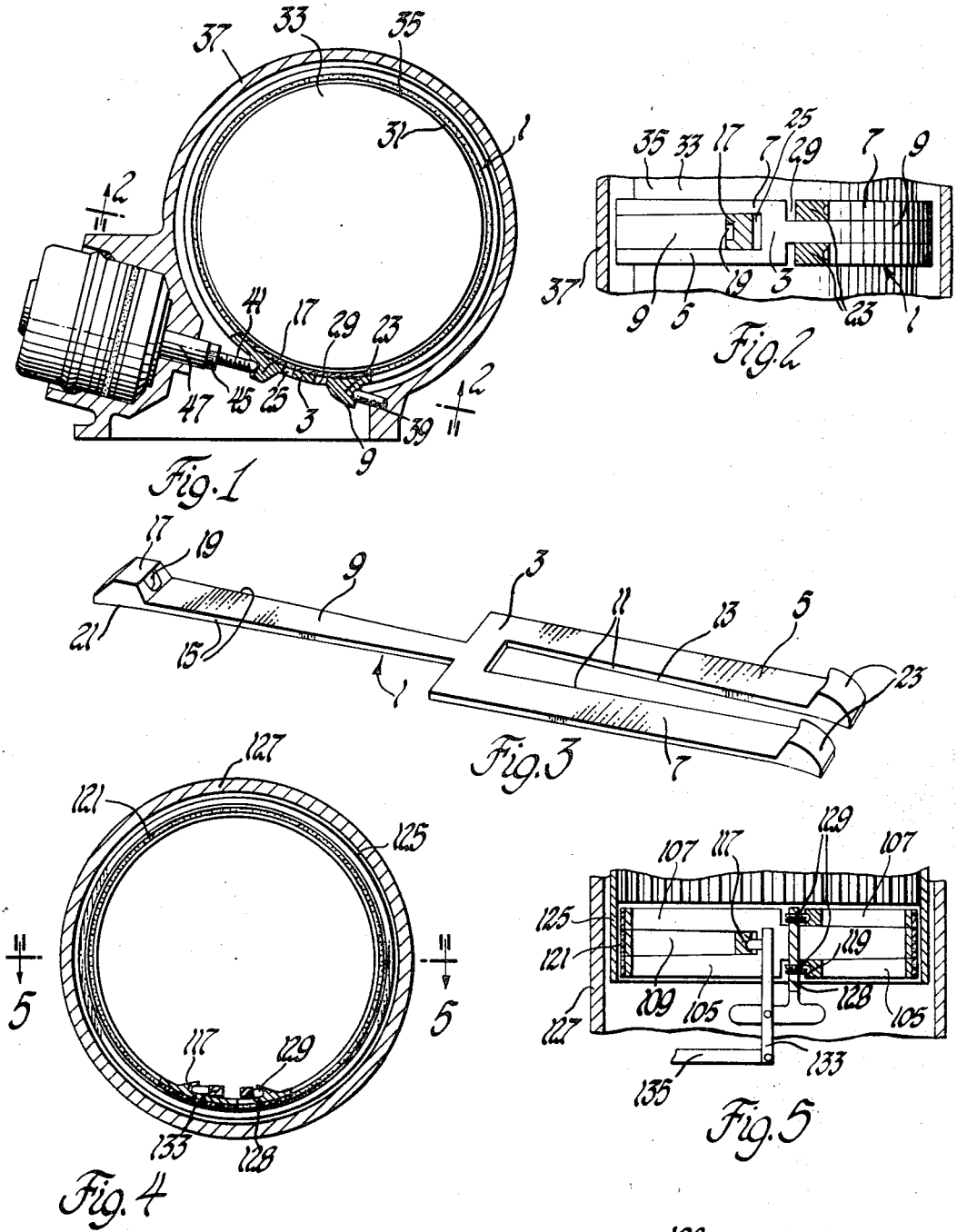
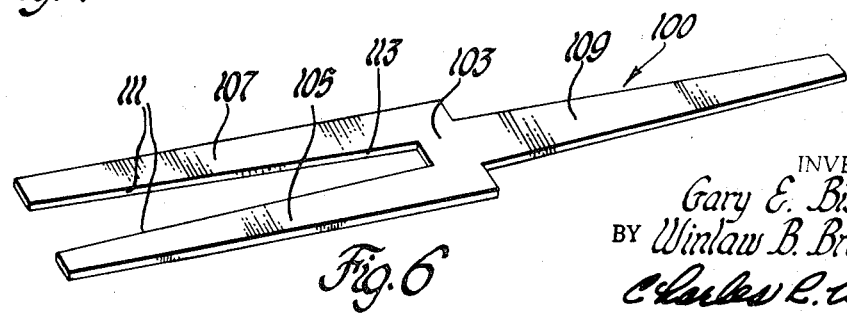

3,531,849
METHOD OF MANUFACTURING A
FRICTION BAND
Gary E. Bishop, Warren, and Winlaw B. Bramley, Milford, Mich., assignors to General Motors Corporation, Detroit, Mich., a corporation of Delaware
Original application Oct. 26, 1966, Ser. No. 589,713, now Patent No. 3,386,535, dated June 4, 1968. Divided and this application Mar. 1, 1968, Ser. No. 709,754
Int. Cl. B03p 19/00
U.S. Cl. 29—428                         4 Claims

ABSTRACT OF THE DISCLOSURE

Resilient metal strip stock is blanked to form a part having two spaced and tapered leg means extending in one direction and having additional tapered leg means extending in an opposite direction. The blanked part is rolled into a hoop so that the additional leg means fits between the two spaced leg means. The hoop is expanded beyond its elastic limit to give it a set and a predetermined size and shape.

---

This application is a division of our copending application Ser. No. 589,713 for "Friction Band," filed Oct. 26, 1966, now Pat. No. 3,386,535.

This invention relates to the manufacture of friction bands and more particularly to a method of manufacturing a multi-wrap friction band for automatic transmissions in which there is minimum clearance between the band legs when in a free position and maximum clearance between the band legs when in an apply position.

In prior plural-wrap friction bands used as friction drive establishing devices in automatic transmissions, band rattle frequently occurred when the transmission was in a neutral condition and when the environmental temperature was low. This rattling condition is caused when the reaction drum engageable by the band picks up cold oil and drags it between the face of the drum and the friction surface of the band. The band influenced by this oil tends to move toward the apply position, but because it is anchored will snap back to its release position. This tendency to move between the apply and release position in rapid succession resulted in the objectionable band rattling. The multi-wrap friction band of this invention solves the problem of band rattle through the use of tapered legs which have minimum clearance therebetween when the band is released and maximum clearance when applied. Minimum clearance reduces vibration and rattle and maximum clearance insures full band apply.

In this invention suitable resilient metal stock is blanked so that the blanked part will have at least two spaced, legs tapered in width and extending in one direction and at least one tapered leg tapered in width and extending in an opposite direction. The shape of the last mentioned leg generally conforms to the space formed between the spaced legs.

The ends of the legs of the blanked parts are upset to provide projections for receiving ground and adjusting screw members and a servo apply rod. The blanked part is then rolled into a hoop with the single leg extending between the spaced legs. The hoop is then expanded to give the band a predetermined set and is then supplied with a suitable friction liner.

In contrast to applicant's invention, prior multi-wrap bands were made by forging a portion of the annular part. This forging which includes the lugs is welded to blanked sheet metal. The part is then sawed into the appropriate sections. The deburring of the saw cuts is time consuming and requires a high degree of skill. Such steps are expensive and also could not readily produce a tapered leg design.

An object of this invention is to provide a new and improved method of manufacturing friction bands including the steps of stamping blanks for the bands and rolling the blanked parts into hoops and stretching the hooped parts into a predetermined shape.

Another object of this invention is to provide a method of manufacturing a friction band comprising the steps of blanking a part from resilient metal stock with oppositely extending legs having tapered edges, upsetting the ends of each leg to provide a lug, rolling the part into a hoop so that the oppositely extending legs interfit with each other, stretching the band to give it a predetermined size and shape and providing the band with a suitable friction liner.

Another object of this invention is to provide an advanced method of manufacturing a friction band in which a part is blanked from a metallic strip with spaced tapered legs extending in one direction, and a single tapered leg extending in an opposite direction, rolling the band into a hoop with the single leg extending between the spaced legs, expanding the band so that there is minimum clearance between the legs and applying a suitable friction liner to the band.

These and other objects of this invention will become more apparent from the following detailed description and drawings in which:

FIG. 1 is a sectional view of a portion of an automatic transmission;

FIG. 2 is a view partly in section generally taken along line 2—2 of FIG. 1;

FIG. 3 is a perspective view of the band utilized in FIGS. 1 and 2;

FIG. 4 is a view similar to FIG. 1 but illustrating another embodiment of the invention;

FIG. 5 is a view taken generally along the line 5—5 of FIG. 4, and

FIG. 6 is a perspective view of a blanked double-wrap band for use in the embodiment of FIGS. 4 and 5.

Turning now to the drawings, there is shown in FIG. 3 a double-wrap band 1 which has been blanked or otherwise formed from flexible metallic strip stock. This band has a center bridge portion 3 and similar spaced legs 5 and 7 which extend therefrom in one direction and a central leg 9 which extends from the bridge portion in an opposite direction. Legs 5 and 7 have outer edges which are parallel with each other and perpendicular to the bridge portion but have inner edges 11 which taper inwardly so that the legs 5 and 7 become increasingly larger as they extend away from the bridge portion. These legs define an outwardly narrowing tapered slot 13 which conforms with the leg 9 having edges 15 which taper outwardly from the bridge portion. As shown, the width of leg 9 increases as it extends outwardly therefrom.

After the band is blanked, the leg 9 is provided with a lug 17 recessed at 19 which is preferably formed by upsetting the end thereof. The leg is then slightly bent inwardly as at 21. Also, each of the legs 5 and 7 are similarly provided with lugs 23 by upsetting the leg ends and are also bent slightly inwardly as illustrated. The sides of the lugs are then machined to remove any rough edges. The band is then rough formed by rolling it into a hoop by the use of suitable rolling or forming equipment. When properly rolled, the leg 9 fits between legs 5 and 7.

After this rough forming the band is sized by a conventional stretching fixture, not illustrated, which expands the band beyond its elastic limit so as to effect a set in the band and give it a predetermined size and shape. When removed from the fixture, the band will be generally cylindrical with the edges 15 of the leg 9 contacting or closely adjacent to the interior edges 11 of the legs 5 and 7. Also there is clearance 25 between the end of leg 9 and one end of bridge 3 and clearance 29 between the ends of legs 5 and 7 and the other end of the bridge. These clearances provide travel distance to allow the band to be contracted as will be pointed out below.

After the sizing of the band, a suitable friction liner 31 is attached to the interior surface thereof. This liner may be formed by a plurality of curved parts shaped to conform with the profile of the tapered legs or may be formed from a single cylindrical part having legs which are like the legs of the band. Subsequent to the apply of the lining to the band, the friction band can then be installed in an environment such as that illustrated in FIG. 1.

As shown in this figure, there is a drum 33 which has an exterior annular friction surface 35 which is engageable by the friction liner of the band upon the contraction thereof. The drum may be suitably secured to a control gear of a power transmitting planetary gear set, not illustrated. When installed, the friction band is grounded to a transmission case 37 by the use of projections or stud pins 39 which fit into recesses provided in the lugs 23 as shown best in FIG. 1. The lug 17 provided on the end of leg 9 is adjustably connected by a threaded link 41 to a nut 45 secured to a hydraulically actuated apply piston 47 suitably mounted in the case.

When the piston 47 is retracted, the band will be in its expanded position as shown in FIGS. 1 and 2 with the liner 31 spaced from the drum. In this position the outer edges 15 of the central leg 9 are in contact with or closely adjacent to the inner edges of the legs 5 and 7. This contact or small clearance will dampen vibrations of the legs when the band is in release position and will reduce or eliminate resultant rattle or other noise.

The band is contracted toward a true circle by energizing the piston 47. Apply movement of the piston moves the linkage 41 and the lug 17 toward the bridge to take up part of the travel space, thereby contracting the band. When contracted, the friction face of the band will engage the outer surface of the drum and retard rotation thereof and condition the planetary gear unit for a ratio change. As the band is contracted, it will be appreciated that the clearance between the legs will increase as the end 27 of leg 9 moves toward the respective end of the bridge. After the drum is retarded from rotation, the piston may again be retracted and the friction band will spring back to the set position of FIG. 2. The drum will then be released.

The second embodiment of the invention is illustrated in FIGS. 4, 5 and 6. FIG. 6 shows the double-wrap friction band 100 as blanked from a flexible metal strip stock. This band has a central bridge 103 and spaced legs 105 and 107 which extend therefrom in one direction and an oppositely extending central leg 109. The outer edges of legs 105 and 107 are straight but have inner edges 111 which taper from the bridge portion in a manner so that the legs 105 and 107 become increasingly smaller as they extend away from the brdige portion. These two legs define an outwardly extending tapered slot 113 which gradually increases to conform with the dimensions of single leg 109. As shown, leg 109 is tapered outwardly from the bridge portion in a manner so that the width decreases as it extends from the bridge portion.

The legs 109, 105 and 107 are provided with lugs 117 and 119 which may be formed by an upsetting of the ends of the legs and machined as described in connection with the previous embodiment. The friction band is then cylindrically shaped into a hoop and stretched to give it a permanent set. After sizing, the side edges of leg 109 contact the respective inner edges 111 of legs 105 and 107; the outer periphery is then provided with a suitable friction liner 121 similar to the liner described above.

The band may then be installed in an environment such as that illustrated in FIG. 4.

As shown in this figure, there is a drum member 125 having an interior friction surface which is engaged by the friction liner 121 of the band. The drum, as in the previous embodiment, may be secured to the control gear of a power transmitting planetary gear set, not shown. The friction band is grounded to a transmission case or housing 127 by adjustment screws 129 which thread through an extended portion 128 of the case 127 into contact with the lugs 119. The lug 117 provided on the end of the leg 109 is connected by a pivoted lever 133 to an apply piston 135 similar to that of FIG. 1. When the piston is retracted, the brake band will be in its relaxed position and the liner will be spaced from the interior of the drum.

This position, illustrated in FIG. 5, shows the outer edges of the central leg 109 in contact with or closely adjacent to the inner edges 111 of the legs 105 and 107. This contact or close clearance when the band is in a free position will diminish or eliminate any tendency of the legs to vibrate and produce noise. The band can be expanded by energizing the piston so that apply movement of the piston pivots lever 133. The lever will then cause the band to expand. When expanded, the exterior friction face of the band will engage the interior of the drum and retard rotation thereof to condition the planetary gear unit for establishing a ratio.

As the band is expanded for band apply, the clearance between the legs will increase.

From the above it will be understood that applicants have provided an improved method of manufacture of a resilient, one-piece, metallic friction band which may be used as a multiple-wrap, self-energizing brake band for an automatic transmission. The band may be readily made from strip stock with a blanking die which can simultaneously form the single leg on one part and two legs on the next part. With applicants' construction the band has a uniform width when hooped and there is a built-in clearance between the legs and no sawing or cutting of the legs is necessary. When the brake band is released, the legs will be closely adjacent or in contact with each other to minimize band rattle or vibration noises.

Although applicants have disclosed and described several embodiments of their invention it will be appreciated that other designs and configurations may be employed utilizing applicants' teachings which provide the same advantageous result.

Thus, for example, a blank having two spaced and suitably tapered legs extending in one direction and three spaced and suitably tapered legs extending in an opposite direction may be formed itno a hoop with the two legs extending into respective spaces between the three legs in a manner similar to that of FIG. 2 or FIG. 5. It will therefore be understood that this invention is to be limited only by the claims which follow.

We claim:

1. The method of making a multi-wrap friction band comprising the steps of: blanking a member from resilient stock into a part having a plurality of oppositely extending legs tapered in width with a slot defined between two of said legs which conforms to the taper in width of at least one of said legs, providing lugs on the ends of said legs, rolling the part into a hoop with at least one of said legs extending into the slot between two of said legs expanding the hooped member to give it a permanent set and providing the hooped member with a friction surface.

2. The method of making a multi-wrap band defined in claim 1 in which said lugs are provided by upsetting the end portions of said legs.

3. The method of manufacturing a friction band for the plural encirclement of a reaction drum and the selective engagement therewith and wherein the band includes at least one central leg disposed between coextensively outer legs, the method comprising, blanking a one-piece part from a resilient metal having two spaced legs tapered in width with a tapered slot between said spaced legs and extending in one direction from a bridge portion and a central leg tapered in width similar to the tapered slot and extending from the bridge portion in an opposite direction, forming lugs on the free end portion of each of the legs, rolling the blanked part into a hoop with the central leg disposed between the spaced legs, stretching the hoop to a predetermined size to provide for minimum clearance between the central leg and the spaced legs, and providing the friction band with a friction surface.

4. The method of manufacturing a double-wrap friction band for the encirclement of a reaction drum and for the selective frictional engagement therewith, the method comprising, blanking a one-piece part from stock of resilient metal with two spaced legs extending from a bridge portion in one direction and defining an opening tapered in width therebetween and with a central leg extending in an opposite direction formed with a taper in width which matches the taper of the recess between the spaced legs, providing lugs on the end portion of each of the legs, rolling the parts into an annulus with the central leg disposed between the spaced legs, stretching the annulus so that the central leg contacts the spaced legs and to give the annulus a set, and providing the annulus with a friction liner.

References Cited

UNITED STATES PATENTS

| Re. 22,601 | 2/1945 | Sprouse | 24—286 |
| 2,692,663 | 10/1954 | Reed et al. | 188—77 XR |
| 2,857,162 | 10/1958 | Zuercher. | |
| 2,867,898 | 1/1959 | Vosler et al. | 29—434 XR |
| 2,976,592 | 3/1961 | Christin et al. | |

FOREIGN PATENTS

| 166,902 | 1/1922 | Great Britain. |

CHARLIE T. MOON, Primary Examiner

U.S. Cl. X.R.

24—23, 286